United States Patent
Li et al.

(10) Patent No.: US 10,484,730 B1
(45) Date of Patent: Nov. 19, 2019

(54) CHUNKED TRANSFER MODE BANDWIDTH ESTIMATION

(71) Applicant: Twitch Interactive, Inc., San Francisco, CA (US)

(72) Inventors: Yuechuan Li, Issaquah, WA (US); Yueshi Shen, Cupertino, CA (US); Graham Keefe Tremper, San Francisco, CA (US); Abhinav Kapoor, Fremont, CA (US); Matthew Szatmary, Walnut Creek, CA (US); Nikhil Purushe, San Francisco, CA (US); Eran Ambar, Sunnyvale, CA (US)

(73) Assignee: Twitch Interactive, Inc., San Francisco, CA (US)

( * ) Notice: Subject to any disclaimer, the term of this patent is extended or adjusted under 35 U.S.C. 154(b) by 114 days.

(21) Appl. No.: 15/879,277

(22) Filed: Jan. 24, 2018

(51) Int. Cl.
  *H04L 29/06* (2006.01)
  *H04N 21/2662* (2011.01)
  *H04N 21/442* (2011.01)
  *H04N 21/238* (2011.01)

(52) U.S. Cl.
  CPC ....... *H04N 21/2662* (2013.01); *H04N 21/238* (2013.01); *H04N 21/44227* (2013.01)

(58) Field of Classification Search
  None
  See application file for complete search history.

(56) References Cited

U.S. PATENT DOCUMENTS

| | | | | |
|---|---|---|---|---|
| 10,015,225 | B2 * | 7/2018 | Gouache | H04N 21/23439 |
| 2009/0141800 | A1 * | 6/2009 | Larson | H04N 21/2365 375/240.12 |
| 2013/0283330 | A1 * | 10/2013 | Hengeveld | H04N 7/181 725/116 |
| 2014/0244805 | A1 * | 8/2014 | Lee | H04W 8/245 709/219 |
| 2015/0067819 | A1 * | 3/2015 | Shribman | H04L 67/06 726/12 |
| 2017/0373984 | A1 * | 12/2017 | Sarapure | H04L 47/365 |

* cited by examiner

*Primary Examiner* — Natisha D Cox
(74) *Attorney, Agent, or Firm* — BakerHostetler (57) ABSTRACT

Techniques for estimation of bandwidth for transfer of video content in chunked transfer mode are described herein. A number of chunk samples may be collected during video content transmission. For each chunk sample, its respective delivery speed may be compared to its respective encoding bitrate. If the delivery speed is greater than or equal to the encoding bitrate, then the chunk sample may be included in a primary set of chunk samples. The primary set of chunk samples may be clustered into a lower speed cluster and a higher speed cluster. A representative speed, such as an average or weighted average speed, of the delivery speeds of the chunk samples in the lower speed cluster may be determined, and the bandwidth may be estimated based on the representative speed.

20 Claims, 8 Drawing Sheets

CHUNKED TRANSFER MODE BANDWIDTH ESTIMATION

BACKGROUND

The popularity of video streaming has increased rapidly in recent years. In some cases, video content may correspond to an event, such as news event, a sporting event, or another event. In some examples, the video content may be transmitted to viewers and played using live streaming techniques. For example, video of an event may be transmitted to viewers and played while the event is still occurring, albeit with some latency between the time that video is captured by the provider and the time that the video is eventually played to viewers. In some examples, chunked transfer mode may be employed to reduce the latency associated with live streaming techniques. In chunked transfer mode, requested video content may be broken into a number of chunks for transmission, thereby enabling a reduction in the transfer latency of the video content. While chunked transfer mode may provide advantages such as those described above, it may also increase the difficulty and complexity associated with bandwidth estimation.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Various techniques for estimation of bandwidth for transfer of video content in chunked transfer mode are described herein. In particular, in some examples, video may be transmitted from a transmitter to a recipient using adaptive bitrate (ABR) streaming techniques. In ABR streaming, a transmitter may encode video content into a number of different renditions having different respective image qualities (e.g., encoding bitrates, resolutions, etc.) with respect to one another. The recipient may then periodically select and switch between these different renditions during transmission of the video content. For example, in some cases, the recipient may select and switch between renditions based, at least in part, on changes in bandwidth. In particular, in some cases, when bandwidth is higher, the recipient may request higher image quality renditions. By contrast, in some cases, when bandwidth is lower, the recipient may request lower image quality renditions. Thus, the ability to accurately estimate bandwidth may be an important aspect of ABR streaming and other techniques, such as to improve video content quality and to reduce transmission errors and delays.

In some examples, video may be streamed in chunked transfer mode, such as hypertext transfer protocol (HTTP) chunked transfer mode. In chunked transfer mode, requested video content may be broken into a number of chunks for transmission, thereby enabling a reduction in the transfer latency of the video content. Thus, in some examples, chunked transfer mode may be particularly advantageous for live streaming techniques in which latency reduction is prioritized. While chunked transfer mode may provide advantages such as those described above, it may also increase the difficulty and complexity associated with bandwidth estimation, which may potentially reduce the efficiency of ABR streaming techniques when bandwidth is not accurately estimated. Bandwidth estimation for chunked transfer mode may be difficult because, in chunked transfer mode, the data receiving speed is bounded not only by network throughput, but also by an encoder's data delivering speed. For example, in some cases, when a network bandwidth is higher than an encoder's data delivery speed (e.g., encoding bitrate), there may be waiting periods between encoding of frames, thereby resulting in the network bandwidth being not fully utilized. For example, such a waiting period may occur during the time between a completion of transmission of a prior video frame and a completion of encoding of a subsequent video frame.

In some examples, the chunked transfer mode bandwidth may be estimated based on a number of chunk samples collected during video content transmission. In some cases, for each chunk sample, a chunk sample delivery speed may be determined. The chunk sample delivery speed may be determined by dividing a size (e.g., the quantity of bytes) of the chunk sample by a delivery duration of the chunk sample. The delivery duration of the chunk sample may be determined as the duration between a time that the chunk sample is received by a video player and a time that a prior chunk sample was received by the video player.

It may then be determined, for each chunk sample, whether its respective chunk sample delivery speed is less than its respective encoding bitrate. If the chunk sample delivery speed is less than its encoding bitrate, then the chunk sample may be included in a secondary set of chunk samples. By contrast, if the chunk sample delivery speed is greater than or equal to its encoding bitrate, then the chunk sample may be included in a primary set of chunk samples. The chunk samples that are included in the primary set of chunk samples may then be grouped into a plurality of chunk sample groups based, at least in part, on their respective chunk sample delivery speeds. In some examples, the plurality of chunk sample groups may include a higher speed group and a lower speed group. In some examples, the chunk samples may be grouped into the plurality of groups by executing one or more clustering algorithms to cluster the chunk samples into a plurality of clusters. Also, in some examples, the clustering algorithm may group the chunk samples into clusters such that the sum of the clusters' variances is minimized or otherwise reduced below one or more amounts.

Upon grouping the primary chunk sample set into a plurality of groups, the bandwidth may then be estimated based, at least in part, on a representative delivery speed of a selected one of the plurality of groups. In particular, in some examples, the bandwidth may be estimated to be equivalent to, and/or estimated as a function of, the representative delivery speed of the selected chunk sample group. In some cases, the plurality of groups may include a lower speed group and a higher speed group, and the bandwidth may be estimated based, at least in part, on a representative delivery speed of the lower speed group. This is because, in some examples, the higher speed group may be considered to represent less reliable (e.g., outlier) delivery speeds that are less representative of the actual bandwidth. By contrast, in some examples, the lower speed group may be considered to represent more reliable delivery speeds that are more representative of the actual bandwidth. Thus, in some examples, the bandwidth may be estimated based, at least in part, on a representative delivery speed of the lower speed group. In some examples, the representative delivery speed may be an average (e.g., a mean, a weighted average, etc.) of the delivery speeds of the chunk samples in the selected chunk sample group. In one specific example, the representative delivery speed may be a weighted average of the chunk samples in the selected chunk sample group, and the average may be weighted based, at least in part, on delivery durations of the chunk samples. In particular, in some examples, chunk samples with longer delivery durations may be weighted more heavily than chuck samples with shorter delivery durations. In some examples, chunk samples with longer delivery durations may be considered to be generally more reliable (e.g., more representative of the actual bandwidth) than chunk samples with shorter delivery durations.

In some examples, upon estimating the bandwidth using the representative delivery speed of the selected chunk sample group, the estimated bandwidth may be employed by the video player, such as to select a request one or more particular video quality renditions for delivery of the video content. For example, in some cases, when the bandwidth is estimated to be higher, the video player may request higher image quality renditions. By contrast, in some cases, when the bandwidth is estimated to be lower, the video player may request lower image quality renditions.

As set forth above, in some examples, chunk samples whose delivery speeds are determined to be less than the encoding bitrate may be included in a secondary set of chunk samples that is not included in the chunk sample groups/clusters of the primary set of chunk samples. This is because, for those chunk samples whose delivery speeds are less than the encoding bitrate, it may be assumed that the network bandwidth, as opposed to the bitrate of the encoder, is the main limiting factor that determines the delivery speed of those chunks. Accordingly, in some examples, a percentage or amount of chunk samples that are included in the primary chunk sample set, as opposed to the secondary chunk sample set, may be determined, and bandwidth estimation may be performed based on this calculation. In particular, in some examples, for cases in which the percentage or amount of chunk samples in the primary chunk sample set meets or exceeds a particular threshold, the bandwidth may be estimated based on the primary chunk sample set as described above (e.g., based on the representative speed of the lower speed group/cluster). By contrast, in some examples, for cases in which the percentage or amount of chunk samples in the primary chunk sample set is below the threshold, the bandwidth may be estimated based on the secondary chunk sample set (e.g., based on an average speed of the secondary chunk sample set). In this manner, flexible bandwidth estimation techniques may be provided that may be adaptable, such as based on whether the encoding bitrate is generally higher or lower than the network bandwidth.

Figure 1:
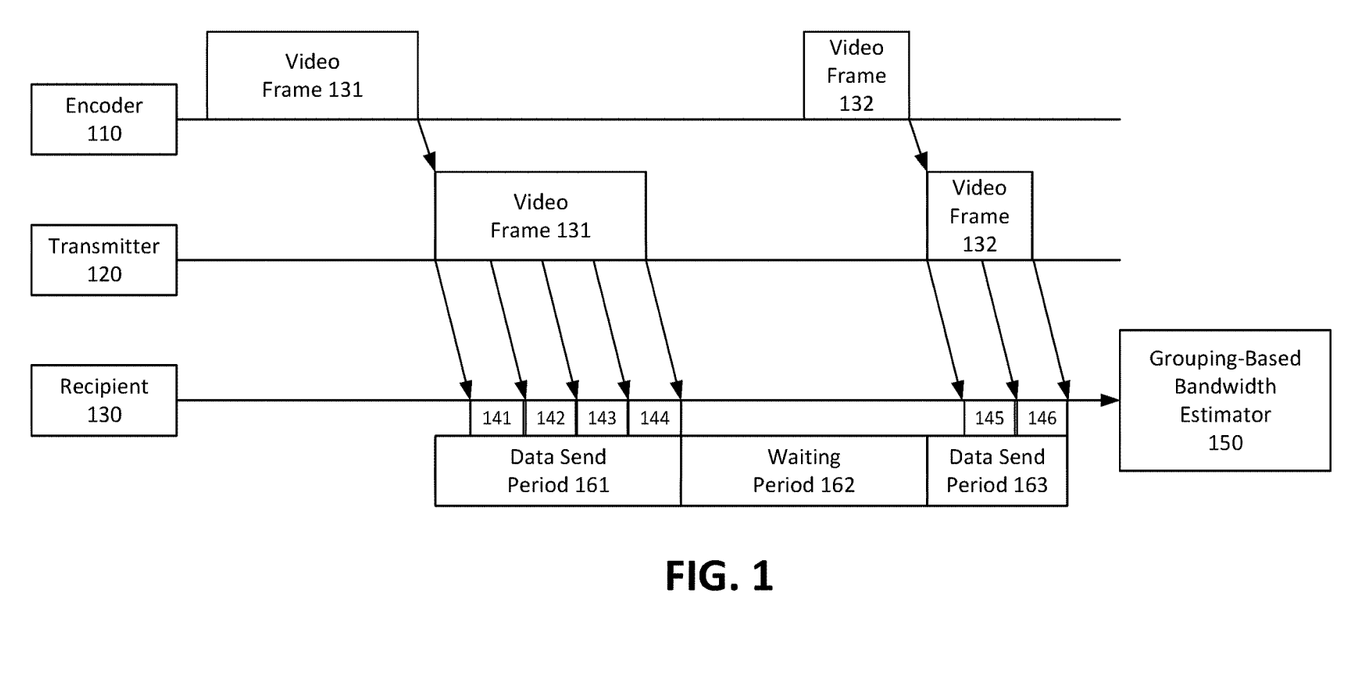
FIG. 1 is a diagram illustrating example chunk samples that may be used in accordance with the present disclosure.

As set forth above, in some examples, video may be transmitted in chunked transfer mode, such as hypertext transfer protocol (HTTP) chunked transfer mode. FIG. 1 is a diagram illustrating example chunk samples that may be used in accordance with the present disclosure. As shown in FIG. 1, an encoder 110 may encode video frames, such as video frames 131 and 132 and any number of additional video frames not depicted in FIG. 1. In some examples, the encoded video frames may vary in size (i.e., the amount of data included in the frames) and may also vary with respect to the amount of time required to encode each frame. Generally, video frames having greater size (i.e., including more data) may take a longer time to encode that video frames having lesser size (i.e., including less data). In the example of FIG. 1, video frame 131 includes more data than video frame 132, as indicated by video frame 131 having a larger size in FIG. 1 than video frame 132.

Upon being generated by encoder 110, video frames 131 and 132 may be provided to transmitter 120, which may transmit the encoded video frames 131 and 132 to a recipient 130. In some examples, transmitter 120 may be a web server, while recipient 130 may be a video player that executes at a remote client device. Also, in some examples, video content including the video frames 131 and 132 may be transmitted from transmitter 120 to recipient 130 over one or more networks, for example one or more local area networks (LAN's) and/or one or more wide area networks (WAN's), such as the Internet. In chunked transfer mode, requested video content may be broken into a number of video data portions, referred to as chunks, for transmission. For example, as shown in FIG. 1, video frame 131 is broken into four chunks 141, 142, 143 and 144, while video frame 132 is broken into two chunks 145 and 146. The breaking of video frames into chunks may enable a reduction in the transfer latency of the video content. Thus, in some examples, chunked transfer mode may be particularly advantageous for live streaming techniques in which latency reduction is prioritized.

While chunked transfer mode may provide advantages such as those described above, it may also increase the difficulty and complexity associated with bandwidth estimation. As described above, an inaccurate estimation of bandwidth may be problematic, such as by potentially reducing the efficiency of ABR and other streaming techniques. Bandwidth estimation for chunked transfer mode may be difficult because, in chunked transfer mode, the data receiving speed is bounded not only by network throughput, but also by an encoder's data delivering speed. For example, in some cases, when a network bandwidth is higher than an encoder's data delivery speed (e.g., encoding bitrate), there may be waiting periods between encoding of frames, thereby resulting in the network bandwidth being not fully utilized. For example, such a waiting period may occur during the time between a completion of transmission of a prior video frame and a completion of encoding of a subsequent video frame.

In particular, as shown in FIG. 1, times at which video data is being transmitted from transmitter 120 to recipient 130 are represented by data send periods 161 and 163.

Specifically, data send period 161 represents times at which video frame 131 (including chunks 141-144) are being transmitted, while data send period 163 represents times at which video frame 132 (including chunks 145-146) are being transmitted. As also shown in FIG. 1, a waiting period 162 occurs between data send periods 161 and 163. During waiting period 162, no video data is transmitted from transmitter 120 to recipient 130, and the network pipe is therefore not fully utilized. In this example, waiting period 162 occurs because video frame 132 has not yet been fully encoded at the conclusion of the transmitting of the prior video frame 131 (i.e., at the end of data send period 161). Thus, in FIG. 1, waiting period 162 represents the time between the conclusion of the transmitting of the prior video frame 131 (i.e., the end of data send period 161) and the start of the transmitting of the subsequent video frame 132 (i.e., the start of data send period 163).

For these and other reasons, bandwidth estimation techniques that may be employed for traditional (i.e., non-chunked transfer mode) streaming may be ineffective when applied to chunked transfer mode streaming. For example, for traditional (i.e., non-chunked transfer mode) streaming, network bandwidth may be measured by the data size (e.g., quantity of bytes) received within a certain time duration. This is represented by the following equation:

traditional(non-chunked transfer)bandwidth=data size/delivery duration

This measurement works well for traditional (i.e., non-chunked transfer mode) streaming, since the data receiving speed is mostly bounded by the network throughput. However, for chunked transfer mode, the duration of waiting periods, such as waiting period 162, also becomes relevant to the bandwidth estimation. Thus, in some examples, bandwidth estimation for chunked transfer mode may be represented by the following equation:

chunked_transfer_bandwidth=data size/(waiting_period_duration+network_transfer_duration)

Specifically, the chunked transfer mode bandwidth may be represented by a data size (e.g., quantity of bytes) divided by a sum of the waiting period duration and the network transfer duration. In some examples, the waiting period duration may be irregular from frame-to-frame, such as due to variance in frame data sizes and frames being generated at irregular time intervals.

Furthermore, in some examples, the timeline of a video player receiving data may also be related to the duration of data transfer between the operating system (OS) kernel and the recipient (e.g., video player, application, etc.). In particular, received data chunks may be added to the OS kernel memory queue first, and then copied from the OS kernel to the recipient in an asynchronous manner. In some examples, the data transfer duration may be measured based on the data chunks' receiving time interval at the application layer, so each data chunk's transfer duration seen at the application layer may be different compared to what's seen at the network layer.

Thus, for reasons such as described above, bandwidth estimation for chunked transfer mode may be both complex and difficult. As will be described in detail below, in some examples, a grouping-based bandwidth estimator 150 may be employed to estimate chunked transfer mode bandwidth by grouping chunk samples, such as chunks 141-146, into two or more groups, such as a high speed group and a low speed group. In some examples, in order to group the chunk samples, the grouping based bandwidth estimator 150 may obtain details regarding the various chunk samples, such as times at which they are received by the video player, their data sizes (e.g., quantity of bytes), encoding bitrates, and other information.

Figure 2:
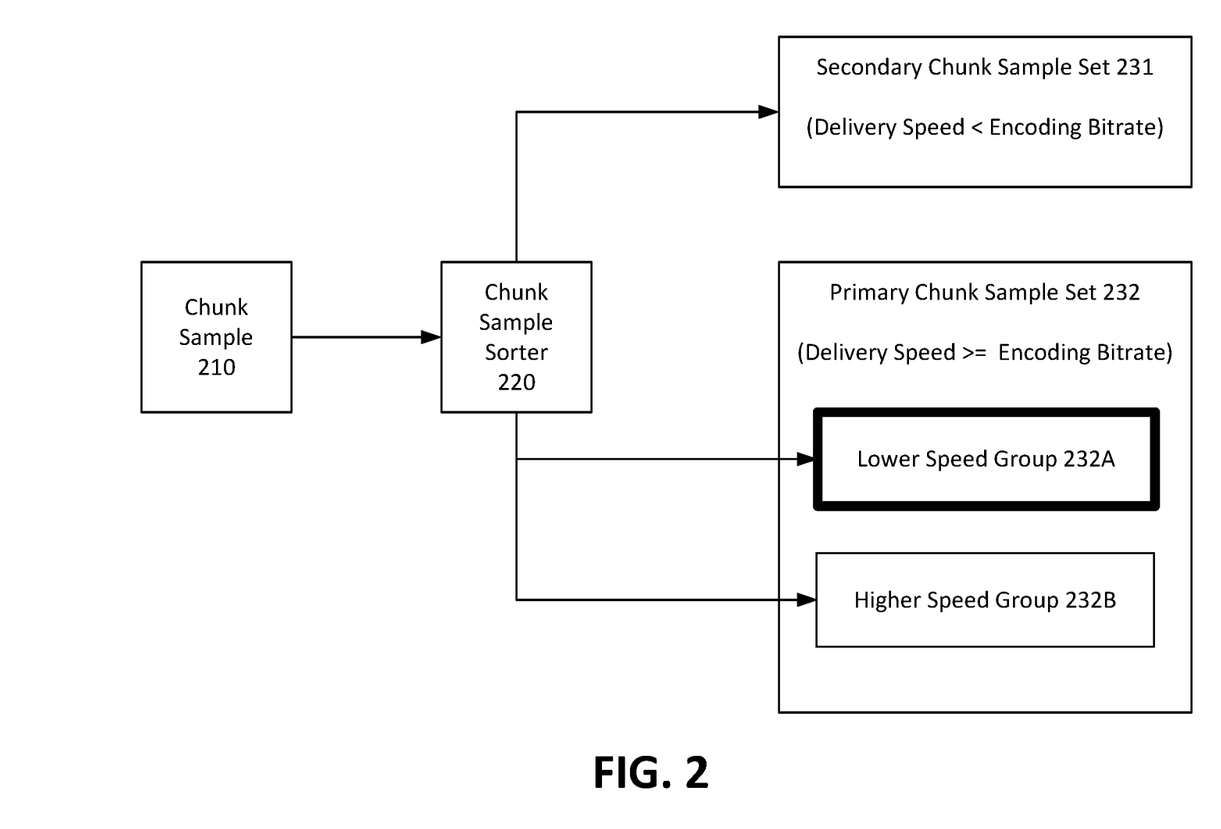
FIG. 2 is diagram illustrating example chunk sample sorting that may be used in accordance with the present disclosure.

Referring now to FIG. 2, some example bandwidth estimation techniques for chunked transfer mode will now be described in detail. In particular, in some examples, the chunked transfer mode bandwidth may be estimated based on a collection of chunk samples 210, for example including chunks 141-146 of FIG. 1. In some cases, for each chunk sample 210, a chunk sample delivery speed may be determined. The chunk sample delivery speed may be determined by dividing a size (e.g., the quantity of bytes) of the chunk sample 210 by a delivery duration of the chunk sample 210. The delivery duration of the chunk sample 210 may be determined as the duration between a time ($t(i)$) that the chunk sample 210 is received by a video player and a time ($t(i-1)$) that a prior chunk sample was received by the video player. For example, for a sample received at time ($t(i)$), its delivery duration may be represented by the following equation:

$$\text{duration}(t(i))=t(i)-t(i-1)$$

Additionally, the chunk sample delivery speed ($\text{speed}(t(i))$) may be represented by dividing the size of the chunk sample ($\text{size}(t(i))$) by its duration ($\text{duration}(t(i))$) as shown in the following equation:

$$\text{speed}(t(i))=\text{size}(t(i))/\text{duration}(t(i))$$

Furthermore, a collection of chunk samples 210 used to estimate the bandwidth may be represented by the following equation:

$$\text{sample}(t(i))=\{\text{speed}(t(i)),\text{duration}(t(i))\}, i>=1 \;\&\&\; i<N$$

In some examples, grouping-based bandwidth estimator 150 may include a chunk sample sorter 220, which may sort each chunk sample 210 based on its delivery speed. In particular, it may be determined, for each chunk sample 210, whether its respective chunk sample delivery speed is less than its respective encoding bitrate. If the chunk sample delivery speed is less than its encoding bitrate, then the chunk sample may be included in a secondary chunk sample set 231. By contrast, if the chunk sample delivery speed is greater than or equal to its encoding bitrate, then the chunk sample may be included in a primary chunk sample set 232. The chunk samples that are included in the primary chunk sample set 232 may then be grouped into a plurality of chunk sample groups based, at least in part, on their respective chunk sample delivery speeds. In the example of FIG. 2, the plurality of chunk sample groups in the primary chunk sample set 232 includes a higher speed group 232B and a lower speed group 232A. In this example, each chunk sample in the lower speed group 232A may have a lower delivery speed than each chunk sample in the higher speed group 232B, while each chunk sample in the higher speed group 232B may have a higher delivery speed than each chunk sample in the lower speed group 232A.

In some examples, the chunk samples in the primary chunk sample set 232 may be grouped into the plurality of groups by executing one or more clustering algorithms to cluster the chunk samples into a plurality of clusters. In some examples, the clustering algorithm may group the chunk samples into clusters such that the sum of the clusters' variances is minimized or otherwise reduced below one or more amounts. One such example clustering algorithm may find a point that divides the primary chunk sample set 232 into two clusters such that a cost is minimized. Such an example clustering algorithm may be represented by the following equation:

$$\text{Cost}(G(c)) = \sum_{i=1}^{n} (\{\text{speed}(t(i)) \mid G(c)\} - AvgSpeed(G(c)))^2$$

In the above equation, (G(c)) represents each cluster, such as may include a high speed cluster and a low speed cluster. Additionally, the cost for each cluster Cost (G(c)) may be determined based on an average speed of the chunk samples in each cluster AvgSpeed (G(c)), which may be determined using the following equation:

$$AvgSpeed(G(c)) = \frac{1}{n}\sum_{i=1}^{n} \{\text{speed}(t(i)) \mid G(c)\}$$

Thus, a clustering algorithm such as represented by the above equations may be used to cluster the chunk such that the cost or sum of the clusters' variances is minimized or otherwise reduced below one or more amounts.

Upon grouping the primary chunk sample set 232 into a plurality of groups, the chunked-transfer mode bandwidth may then be estimated based, at least in part, on a representative delivery speed of a selected one of the plurality of groups. In particular, in some examples, the bandwidth may be estimated to be equivalent to, and/or estimated as a function of, the representative delivery speed of the selected chunk sample group. In some examples, for cases in which the plurality of groups may include a lower speed group and a higher speed group, and the bandwidth may be estimated based, at least in part, on a representative delivery speed of the lower speed group. This is because, in some examples, the higher speed group may be considered to represent less reliable (e.g., outlier) delivery speeds that are less representative of the actual bandwidth. By contrast, in some examples, the lower speed group may be considered to represent more reliable delivery speeds that are more representative of the actual bandwidth. Thus, in some examples, the bandwidth may be estimated based, at least in part, on a representative delivery speed of the lower speed group.

Figure 3:
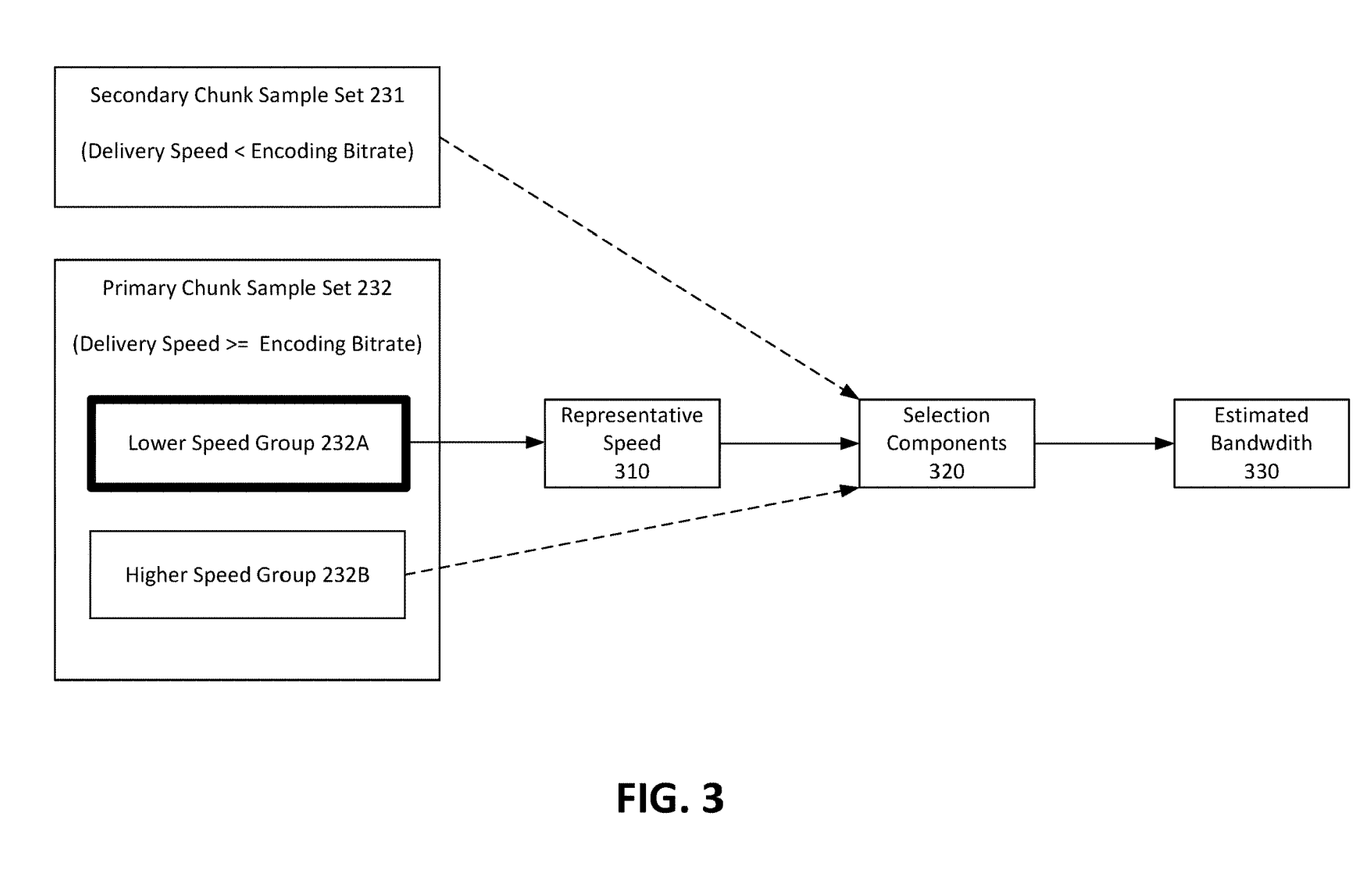
FIG. 3 is diagram illustrating example grouping-based bandwidth estimation that may be used in accordance with the present disclosure.

Referring now to FIG. 3, it is seen that a representative delivery speed 310 is determined for lower speed group 232A. In some examples, the representative delivery speed 310 may be an average (e.g., a mean, a weighted average, etc.) of the delivery speeds of the chunk samples in the lower speed group 232A. In one specific example, the representative delivery speed 310 may be a weighted average of the chunk samples in the lower speed group 232A, and the average may be weighted based, at least in part, on delivery durations of the chunk samples. In particular, in some examples, chunk samples with longer delivery durations may be weighted more heavily than chuck samples with shorter delivery durations. In some examples, chunk samples with longer delivery durations may be considered to be generally more reliable (e.g., more representative of the actual bandwidth) than chunk samples with shorter delivery durations. One example formula for determining a weighted average delivery speed of chunk samples in the lower speed group 232A based on the chunk sample delivery duration is represented by the following equation:

$$\text{weighted\_speed}(G(c0)) = \frac{\sum_{i=1}^{n} (\text{speed}(t(i)) \times \text{weight}(t(i)))}{\sum_{i=1}^{n} \text{weight}(t(t))}$$

In the above equation, the weighted average delivery speed of the lower speed group 232A (weighted_speed G(co))) is determined based on a delivery speed (speed(t(i))) and a weight (weight(t(i))) for each chunk sample in the lower speed group 232A. For each chunk sample, its weight may be determined using the following equation:

$$\text{weight}(t(i)) = \alpha \times \text{duration}(t(i))^\beta$$

In the above equation, the weight of each chunk sample may be determined based on its delivery duration (duration (t(i))) as well as two coefficients $\alpha$ and $\beta$, whose values may be selectable as desired for appropriate weighting.

In some examples, upon determining the representative delivery speed 310 for the lower speed group 232A, selection components 320 may determine an estimated bandwidth 330 based, at least in part, on the representative delivery speed 310. As set forth above, in some examples, the estimated bandwidth 330 may be determined to be equivalent to, and/or determined as a function of, the representative delivery speed of the selected chunk sample group. It is noted that the estimated bandwidth 330 may be an estimated data transfer rate, such as a rate for transferring data from the transmitter 120 of FIG. 1 to the recipient (e.g., video player) 130 of FIG. 1.

In some examples, a representative speed of the higher speed group 232B may also be calculated and used to determine the estimated bandwidth 330. For example, in some cases, the selection components 320 may determine the estimated bandwidth 330 based on both the representative delivery speed 310 of the lower speed group 232A and a representative speed of the higher speed group 232B. In this example, the representative speed of the higher speed group 232B may, in some cases, be assigned a lower weight in determining the estimated bandwidth 330 than the representative delivery speed 310 of the lower speed group 232A. This is because, in some examples, the higher speed group 232B may be considered to represent less reliable (e.g., outlier) delivery speeds that are less representative of the actual bandwidth than the lower speed group 232A.

As set forth above, chunk samples whose delivery speeds are determined to be less than the encoding bitrate may be included in the secondary chunk sample set 231. This is because, for those chunk samples whose delivery speeds are less than the encoding bitrate, it may be assumed that the network bandwidth, as opposed to the bitrate of the encoder, is the main limiting factor that determines the delivery speed of those chunks. Accordingly, in some examples, selection components 320 may determine a percentage or amount of chunk samples that are included in the primary chunk sample set 232, as opposed to the secondary chunk sample set 231, and the bandwidth estimation may be performed based on this calculation. In particular, in some examples, for cases in which the percentage or amount of chunk samples in the primary chunk sample set 232 meets or exceeds a particular threshold, the estimated bandwidth 330 may be determined based on the primary chunk sample set 232 as described above (e.g., based on the representative delivery speed 310 of the lower speed group/cluster 232A). By contrast, in some examples, for cases in which the percentage or amount of chunk samples in the primary chunk sample set 232 is below the threshold, the bandwidth may be estimated based on the secondary chunk sample set 231 (e.g., based on an average delivery speed of the chunk samples in the secondary chunk sample set 231). In this manner, flexible bandwidth estimation techniques may be provided that may be adaptable, such as based on whether the encoding bitrate is generally higher or lower than the network bandwidth.

Figure 4:
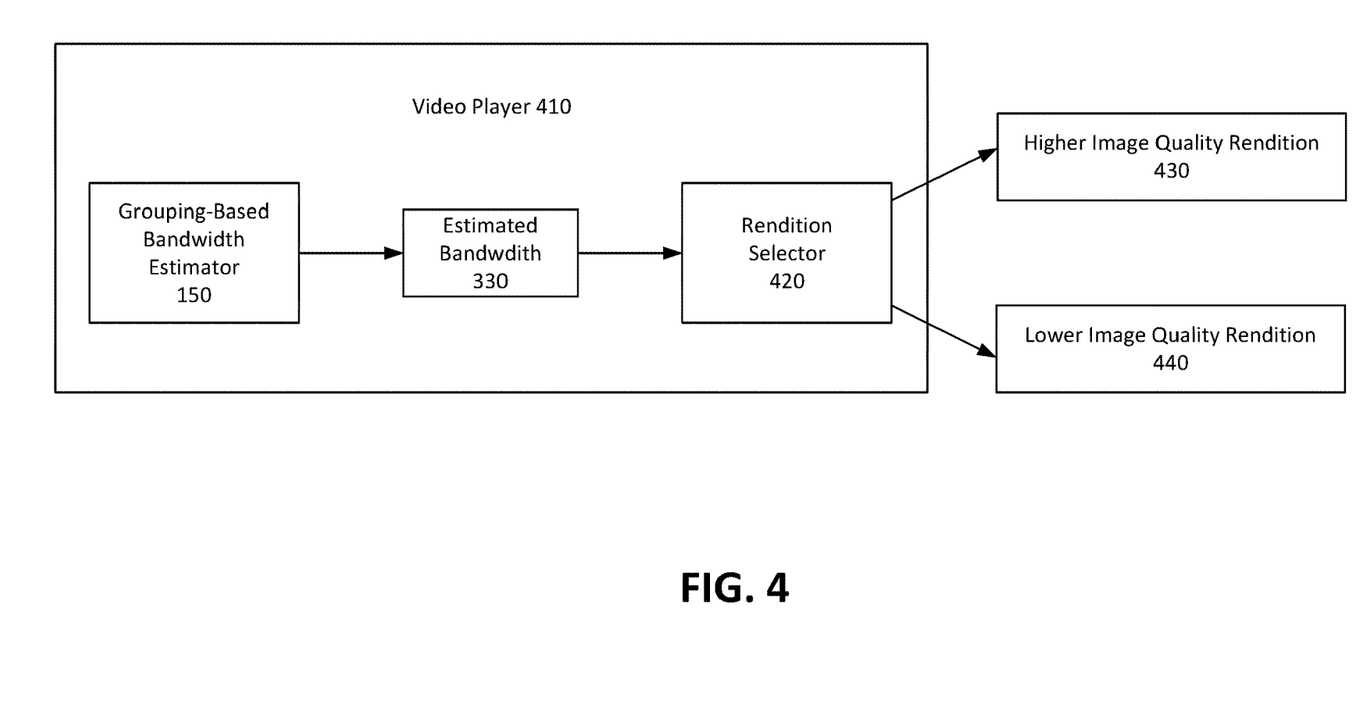
FIG. 4 is a diagram illustrating a second example redundancy system that may be used in accordance with the present disclosure.

Referring now to FIG. 4, it is seen that grouping-based bandwidth estimator 150 of video player 410 may determine the estimated bandwidth 330, such as by using any of the example techniques described in detail above. The estimated bandwidth 330 may then be employed by a rendition selector 420, such as to select and request one or more particular video quality renditions for delivery of video content. As set forth above, in ABR streaming, a transmitter may encode video content into a number of different renditions having different respective image qualities (e.g., encoding bitrates, resolutions, etc.) with respect to one another. The video player may then periodically select and switch between these different renditions during transmission of the video content. For example, in some cases, the video player may select and switch between renditions based, at least in part, on changes in bandwidth. Thus, in some examples, rendition selector 420 may use the estimated bandwidth 330 to select and switch between renditions. In the example of FIG. 4, video content is encoded by the transmitter using a higher image quality rendition 430 and a lower image quality rendition 440. In some examples, when the estimated bandwidth 330 is determined to be higher, the rendition selector 420 may request the higher image quality rendition 430. By contrast, in some examples, when the estimated bandwidth 330 is determined to be lower, the rendition selector 420 may request the lower image quality rendition 440.

Figure 5:
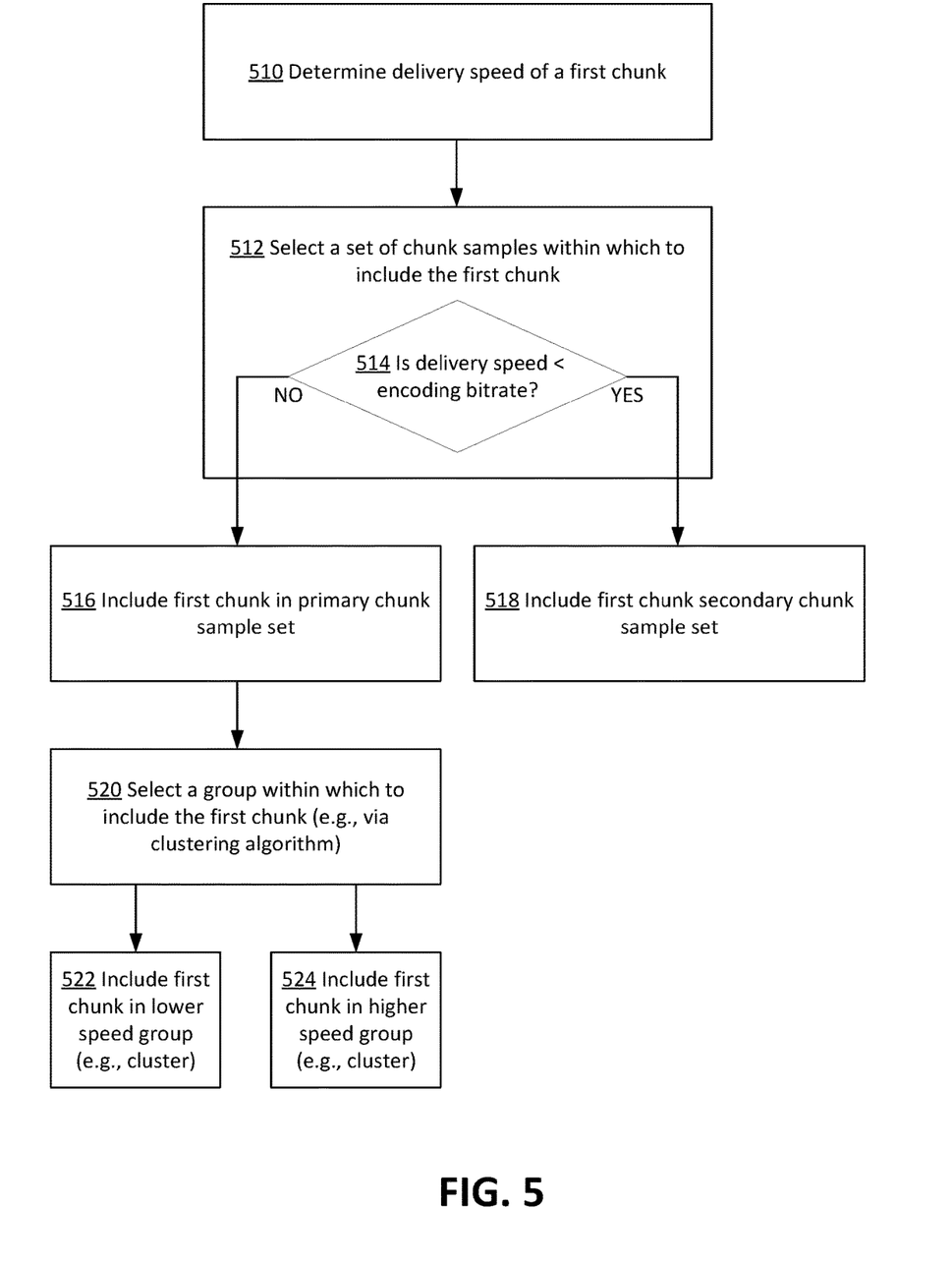
FIG. 5 is a flowchart illustrating an example chunk sample sorting process that may be used in accordance with the present disclosure.

FIG. 5 is a flowchart illustrating an example chunk sample sorting process that may be used in accordance with the present disclosure. As set forth above, the bandwidth estimation techniques described herein may include collecting information associated with a number of chunks, which are portions of video data, such as may be transmitted to a video player for display. For each chunk, the collected information may include a time at which the chunk is received, a data size (e.g. amount of data) in the chunk, an encoding bitrate for the chunk, and various other information. This information may then be used to sort each chunk, for example as shown in FIG. 5 and described below.

In particular, the process of FIG. 5 is initiated at operation 510, at which a delivery speed of a first chunk is determined. The delivery speed is a speed associated with delivery of the first chunk, for example from a transmitter (e.g., web server) to a recipient (e.g., video player). The delivery speed may be determined by dividing a data size (e.g., amount of data) of the first chunk by a delivery duration of the first chunk. The delivery duration of the first chunk may be a duration between a time that the first chunk is received by a video player and a time that a prior chunk was received by the video player.

At operation 512, a set of chunks within which to include the first chunk is determined. In particular, operation 512 may include sub-operation 514, at which it is determined whether the delivery speed of the first chunk is less than an encoding bitrate of the first chunk. If the delivery speed of the first chunk is less than its encoding bitrate, then, at operation 518, the first chunk may be included in a secondary set of chunk samples. By contrast, if the delivery speed of the first chunk is greater than or equal to its encoding bitrate, then, at operation 516, the first chunk may be included in a primary set of chunk samples.

As set forth above, the primary set of chunk samples may include a plurality of chunk sample groups, such as a lower speed group and a higher speed group. The plurality of chunk sample groups may not be included in the secondary set of chunk samples. Accordingly, if the first chunk is included in the primary set of chunk samples, then, at operation 520, a group within which to include the first chunk may be selected. The group may be selected from a plurality of groups, such as the lower speed group and the higher speed group. The group may be selected based, at least in part, on the delivery speed of the first chunk. For example, in some cases, a collection of chunk samples may be sorted, and the chunk samples that are included in the primary chunk sample set, as a result of the sorting, may then be grouped into the lower speed group and the higher speed group. As set forth above, in some examples, the chunk sample groups may be clusters that are clustered using a clustering algorithm that minimizes a sum of the clusters' variances. Examples of such a clustering algorithm are described in detail above and are not repeated here. At operation 522, the first chunk may be included in the lower speed group, for example based on the results of execution of a clustering algorithm (or other grouping technique) upon the primary set of chunk samples. On the other hand, at operation 524, the first chunk may be included in the higher speed group, for example based on the results of execution of a clustering algorithm (or other grouping technique) upon the primary set of chunk samples.

Thus, a sorting process such as shown in FIG. 5 may be employed to sort each cluster in a collection of cluster samples into either the primary or the secondary chunk sample set. Moreover, each chunk sample included in the primary chunk sample set may then be grouped into either the lower speed group or the higher speed group. The sorted chunk samples may then be used to estimate a bandwidth for chunked transfer mode. The estimated bandwidth may be an estimated rate for transfer of data, such as a rate for transferring data from the transmitter (e.g., web server) 120 of FIG. 1 to the recipient (e.g., video player) 130 of FIG. 1. An example process for estimating the chunked transfer mode bandwidth will now be described with reference to FIG. 6.

Figure 6:
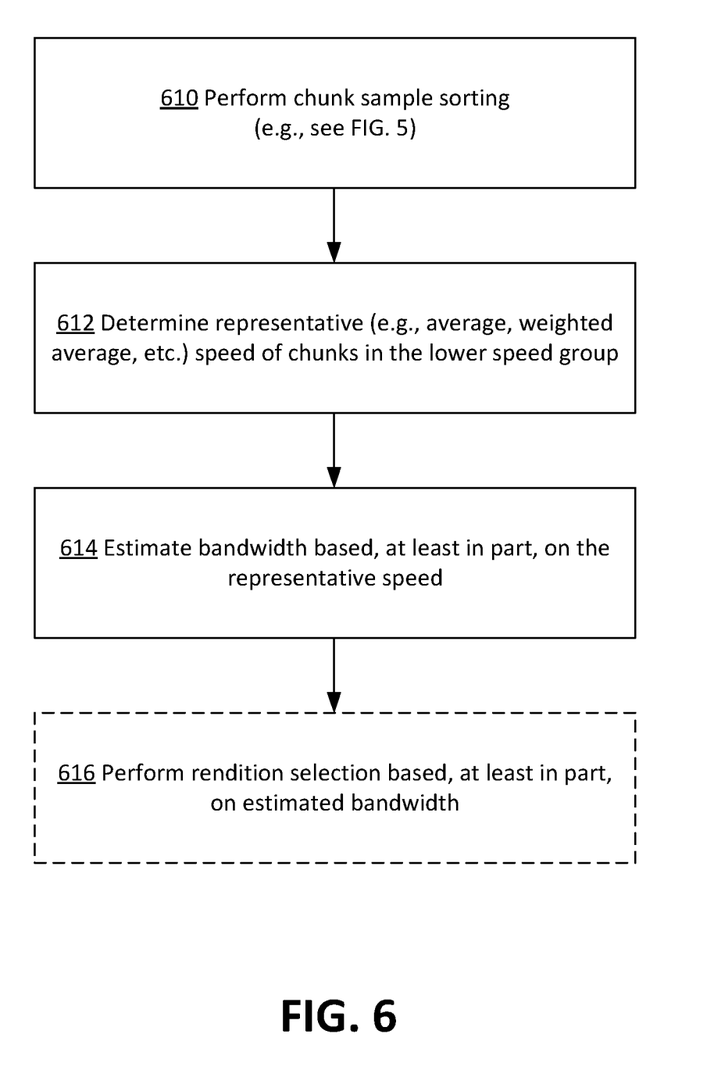
FIG. 6 is a flowchart illustrating an example chunked transfer mode bandwidth estimation process that may be used in accordance with the present disclosure.

In particular, the process of FIG. 6 is initiated at operation 610, at which a chunk sorting process, such as the example process of FIG. 5, is performed, for example for each chunk sample in a collection of chunk samples. As set forth above, such a sorting process may result in a primary chunk sample set and a secondary chunk sample set. Moreover, each chunk sample included in the primary chunk sample set may then be grouped into either a lower speed group or a higher speed group.

At operation 612, a representative speed for the lower speed group of the primary chunk sample set may be determined. The representative speed may represent the delivery speeds of chunks included in the lower speed group. In some examples, the representative speed may be an average (e.g., a mean, a weighted average, etc.) of the delivery speeds of the chunks in the lower speed group. In one specific example, the representative delivery speed may be a weighted average of the chunks in the lower speed group, and the weighted average may be determined based, at least in part, on delivery durations of the chunks. In particular, in some examples, for the weighted average, chunks with longer delivery durations may be weighted more heavily than chucks with shorter delivery durations. In some examples, chunks with longer delivery durations may be considered to be generally more reliable (e.g., more representative of the actual bandwidth) than chunk samples with shorter delivery durations.

At operation 614, the bandwidth is estimated based, at least in part, on the representative speed of the lower speed group. In particular, in some examples, the bandwidth may be estimated to be equivalent to, and/or estimated as a function of, the representative speed of the lower speed group. As set forth above, the representative speed of the lower speed group (e.g., as opposed to the higher speed group) may be selected for various reasons. In particular, in some examples, the higher speed group may be considered to represent less reliable (e.g., outlier) delivery speeds that are less representative of the actual bandwidth. By contrast, in some examples, the lower speed group may be considered to represent more reliable delivery speeds that are more representative of the actual bandwidth. Thus, at operation 614, the bandwidth may be estimated based, at least in part, on the representative speed of the lower speed group. As described above, however, a representative speed of the higher speed group may also sometimes be determined and used to estimate the bandwidth. For example, in some cases, the representative speed of the higher speed group may be combined with the representative speed of the lower speed group, although the representative speed of the lower speed group may be weighted more heavily than the representative speed of the higher speed group, such as to reflect the greater reliability of the speeds in the lower speed group as opposed to the higher speed group. As also described above, in yet other examples, the estimated bandwidth may be determined based on an average (or other representative speed) of the chunks in the secondary chunk sample set. As set forth above, in some examples, this may occur when a percentage or amount of chunk samples in the primary chunk sample set (as opposed to the secondary chunk sample set) is below a particular threshold, thereby indicating that the secondary chunk sample set may be more reflective of the actual bandwidth.

At operation 616, rendition selection may be performed based, at least in part, on the estimated bandwidth. As set forth above, in ABR streaming, a transmitter may encode video content into a number of different renditions having different respective image qualities (e.g., encoding bitrates, resolutions, etc.) with respect to one another. A video player may then periodically select and switch between these different renditions during transmission of the video content. For example, in some cases, the video player may select and switch between renditions based, at least in part, on changes in bandwidth. For example, in some cases, when the bandwidth is estimated to be higher, the video player may request higher image quality renditions. By contrast, in some cases, when the bandwidth is estimated to be lower, the video player may request lower image quality renditions.

Figure 7:
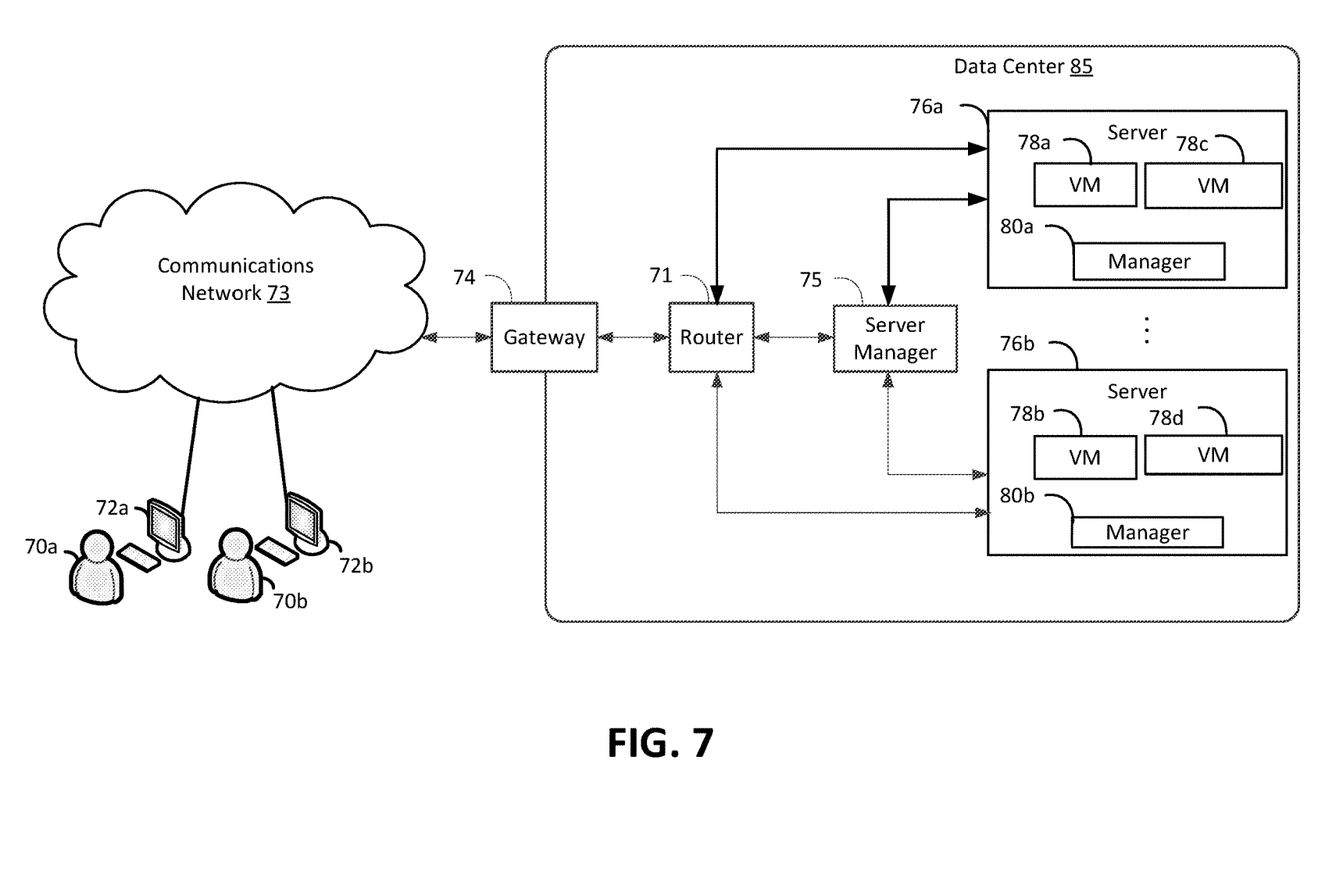
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
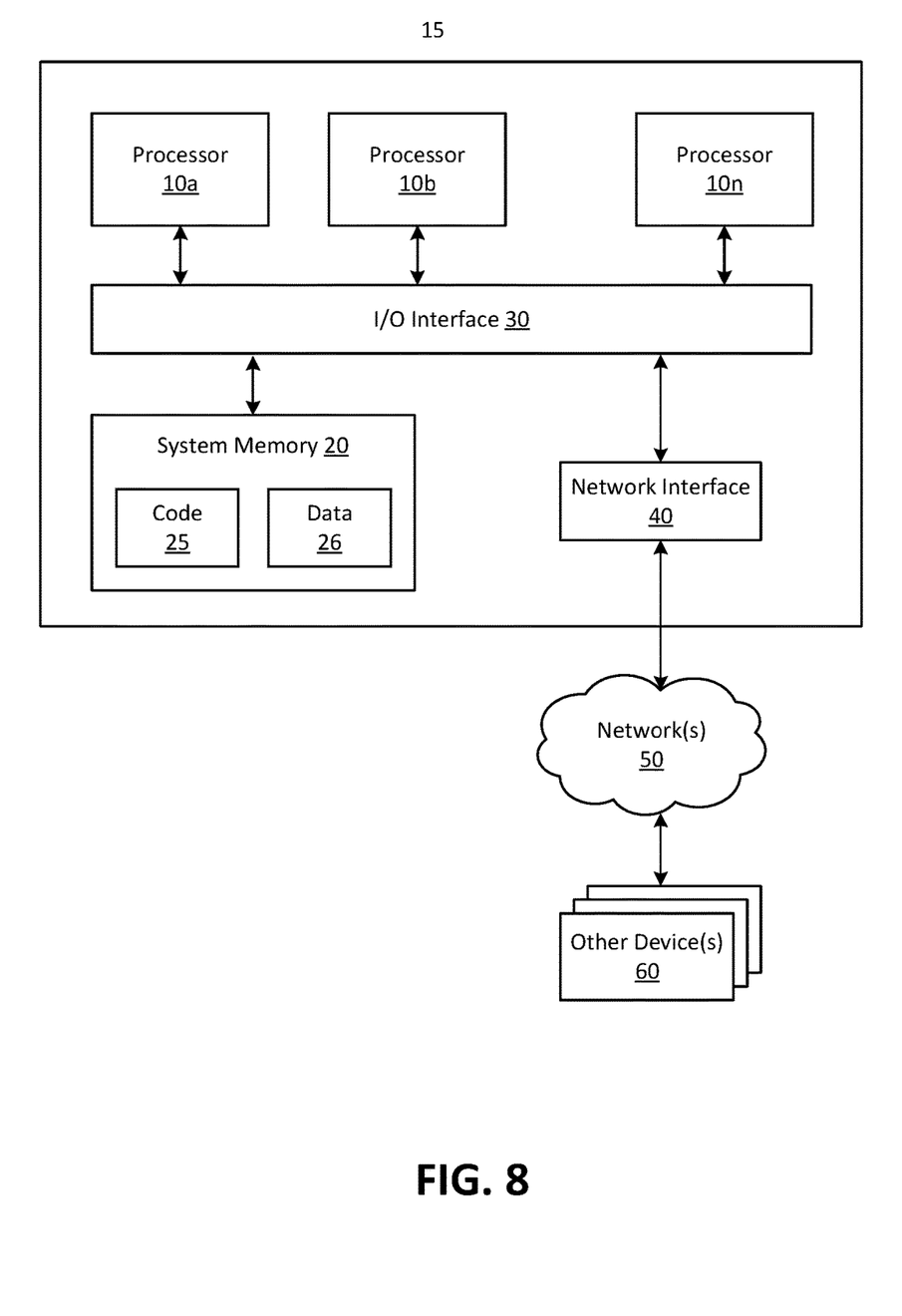
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for estimation of a bandwidth for chunked transfer mode comprising:
   one or more processors; and
   one or more memories having stored therein instructions that, upon execution by the one or more processors, cause the computing system perform operations comprising:
      determining a first speed associated with delivery of a first chunk;
      selecting, from a plurality of chunk groups, a first chunk group within which to include the first chunk, wherein the first chunk group is selected based at least in part on the first speed;
      determining a representative speed that represents speeds of a plurality of chunks included in the first chunk group; and
      estimating the bandwidth based, at least in part, on the representative speed.

2. The computing system of claim 1, wherein the plurality of chunk groups comprises a higher speed group and a lower speed group, and wherein the representative speed is determined for the lower speed group.

3. The computing system of claim 1, wherein chunks whose delivery speeds are greater than or equal to their encoding bitrates are included in a first set of chunks that includes the plurality of chunk groups.

4. The computing system of claim 3, wherein chunks whose delivery speeds are less than their encoding bitrates are included in a second set of chunks that does not include the plurality of chunk groups.

5. A computer-implemented method for estimation of a bandwidth comprising:
   determining a first speed associated with delivery of a first video data portion;
   selecting, from a plurality of video data portion groups, a first video data portion group within which to include the first video data portion, wherein the first video data portion group is selected based at least in part on the first speed;
   determining a representative speed that represents speeds of a plurality of video data portions included in the first video data portion group; and
   estimating the bandwidth based, at least in part, on the representative speed.

6. The computer-implemented method of claim 5, wherein the first video data portion is a first chunk, and wherein the bandwidth is a data transfer rate for chunked transfer mode.

7. The computer-implemented method of claim 5, wherein the plurality of video data portion groups are clusters that are clustered using an algorithm that minimizes a sum of variances of the clusters.

8. The computer-implemented method of claim 5, wherein the first speed is determined by dividing a data size of the first video data portion by a delivery duration of the first video data portion.

9. The computer-implemented method of claim 8, wherein the delivery duration is a duration between receipt of the first video data portion and receipt of a prior video data portion.

10. The computer-implemented method of claim 5, wherein video data portions whose delivery speeds are greater than or equal to their encoding bitrates are included in a first set of video data portions that includes the plurality of video data portion groups.

11. The computer-implemented method of claim 10, wherein video data portions whose delivery speeds are less than their encoding bitrates are included in a second set of video data portions that does not include the plurality of video data portion groups.

12. The computer-implemented method of claim 5, wherein the plurality of video data portion groups comprises a higher speed group and a lower speed group.

13. The computer-implemented method of claim 12, wherein the representative speed represents speeds of the plurality of video data portions included in the lower speed group.

14. The computer-implemented method of claim 5, wherein the representative speed is a weighted average speed for which video data portions with longer delivery durations are weighted more heavily than video data portions with shorter delivery durations.

15. One or more non-transitory computer-readable storage media having stored thereon instructions that, upon execution by a computing device, cause the computing device to perform operations comprising:
   determining a first speed associated with delivery of a first video data portion;
   selecting, from a plurality of video data portion groups, a first video data portion group within which to include the first video data portion, wherein the first video data portion group is selected based at least in part on the first speed;
   determining a representative speed that represents speeds of a plurality of video data portions included in the first video data portion group; and
   estimating a bandwidth based, at least in part, on the representative speed.

16. The one or more non-transitory computer-readable storage media of claim 15, wherein the first video data portion is a first chunk, and wherein the bandwidth is a data transfer rate for chunked transfer mode.

17. The one or more non-transitory computer-readable storage media of claim 15, wherein the plurality of video data portion groups are clusters that are clustered using an algorithm that minimizes a sum of variances of the clusters.

18. The one or more non-transitory computer-readable storage media of claim 15, wherein video data portions whose delivery speeds are greater than or equal to their encoding bitrates are included in a first set of video data portions that includes the plurality of video data portion groups.

19. The one or more non-transitory computer-readable storage media of claim 18, wherein video data portions whose delivery speeds are less than their encoding bitrates are included in a second set of video data portions that does not include the plurality of video data portion groups.

20. The one or more non-transitory computer-readable storage media of claim 15, wherein the plurality of video data portion groups comprises a higher speed group and a lower speed group, and wherein the representative speed represents speeds of the plurality of video data portions included in the lower speed group.

* * * * *